(12) United States Patent
Kishi

(10) Patent No.: US 8,085,431 B2
(45) Date of Patent: Dec. 27, 2011

(54) IMAGE PROCESSING APPARATUS, IMAGE FORMING APPARATUS, AND RECORDING MEDIUM

(75) Inventor: Yumiko Kishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 613 days.

(21) Appl. No.: 12/340,082

(22) Filed: Dec. 19, 2008

(65) Prior Publication Data

US 2009/0168109 A1  Jul. 2, 2009

(30) Foreign Application Priority Data

Dec. 27, 2007  (JP) ................. 2007-337027

(51) Int. Cl.
*G06F 15/00* (2006.01)
*H04N 1/407* (2006.01)
(52) U.S. Cl. ........................ 358/1.2; 358/3.26
(58) Field of Classification Search .................. 358/1.2, 358/3.26, 456, 464, 462; 382/260, 275, 660
See application file for complete search history.

(56) References Cited

U.S. PATENT DOCUMENTS

| 5,410,418 | A | * | 4/1995 | Yonezawa | 382/169 |
| 6,169,608 | B1 | * | 1/2001 | Yoshida | 358/1.9 |
| 2002/0009699 | A1 | * | 1/2002 | Hyodo et al. | 434/285 |
| 2002/0159616 | A1 | * | 10/2002 | Ohta | 382/104 |
| 2007/0115505 | A1 | * | 5/2007 | Kakutani | 358/3.01 |
| 2007/0121135 | A1 | * | 5/2007 | Kakutani | 358/1.9 |
| 2010/0020107 | A1 | * | 1/2010 | Chui | 345/690 |

FOREIGN PATENT DOCUMENTS

| JP | B 3539283 | | 1/2001 |
| JP | 2005-117615 | | 4/2005 |
| JP | 2007-008132 | | 1/2007 |
| JP | 02010061069 | * | 3/2011 |

OTHER PUBLICATIONS

J. Yoneda., "Evaluation of Density Variations for a Thermal Recording System" *Fujifilm Research and Development*. No. 42, pp. 40-47. 1997.

* cited by examiner

*Primary Examiner* — Jerome Grant, II
(74) *Attorney, Agent, or Firm* — Dickstein Shapiro LLP

(57) ABSTRACT

An image processing apparatus for performing image reduction correction on target image data corresponding to pixels, includes a deletion position specifying unit configured to specify, as deletion positions of deletion pixels in the target image data, predetermined positions in image regions including the pixels having gradation values that are more than or equal to a predetermined density; and a pixel deleting unit configured to delete the deletion pixels at the deletion positions specified by the deletion position specifying unit, and to shift the pixels subsequent to the deletion pixels in a reduction direction as the deletion pixels are deleted.

9 Claims, 14 Drawing Sheets

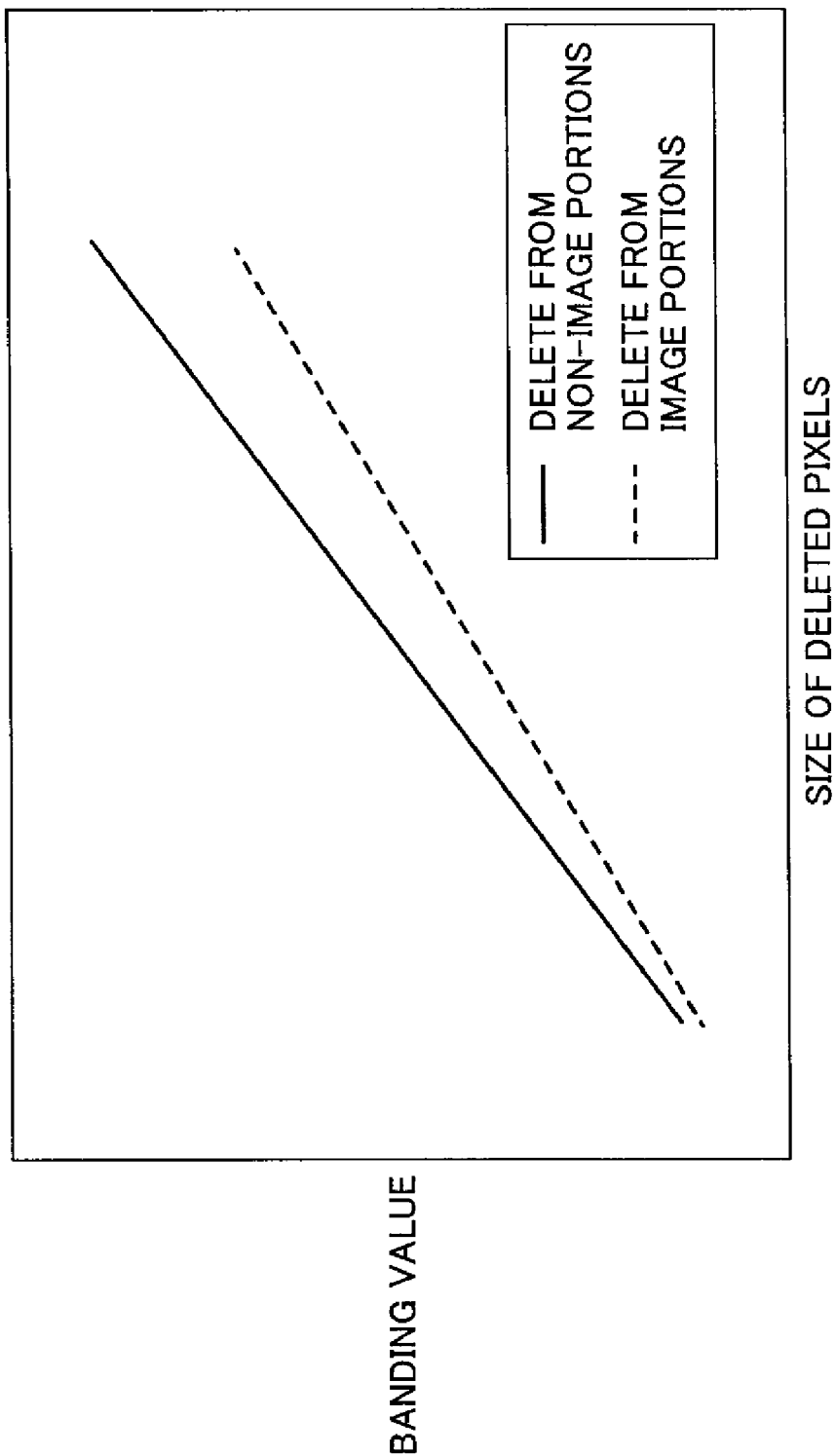

IMAGE PROCESSING APPARATUS, IMAGE FORMING APPARATUS, AND RECORDING MEDIUM

BACKGROUND OF THE INVENTION

1. Field of the Invention

The present invention relates to image processing, and more particularly to an image processing apparatus, an image forming apparatus, and a recording medium, for performing image reduction correction on image data by deleting pixels.

2. Description of the Related Art

In recent years and continuing, there are increasingly more demands for image forming apparatuses with higher performance. In order to meet demands for image forming processes performed with higher speed, higher precision, and higher quality, various problems are to be considered. For example, while performing automatic double-sided printing, a paper sheet may become slightly reduced in size due to the fixing/heating operation. As a result, the position of an image formed on the first side of the transfer sheet may be displaced from that on the second side of the transfer sheet.

Furthermore, in electrophotographic color printing operations, a tandem method is preferably applied as it is advantageous in terms of high speed. However, the positions of the images formed by the image forming units of the respective colors may be displaced from each other.

In order to mitigate degradations in the image quality caused by such positional displacements, there has been proposed a process of deleting pixels from the original image data before forming the image, in accordance with the detected amount of changes or the anticipated amount of changes in the sheet size, so that the image data can be corrected for achieving the desired image size. However, when there are cycles in the image forming operation, such as cycles for deleting pixels, the formed images may have degraded image quality. Examples of degraded image quality are streak-like irregularities and moiré that appear at particular spatial frequencies of the pixel deleting operation. Thus, there is a need for a measure to prevent such degraded image quality.

FIG. 14 schematically illustrates an example of an image reduction correction process performed by deleting pixels. FIG. 14 shows images corresponding to image data including two-dimensional arrangements of pixels, in which the pixels are represented by squares "□". Furthermore, the hatched pixels correspond to pixels to be deleted. In FIG. 14, image data 610 is the data of the image before undergoing the image reduction correction process, and image data 600 is the data of the image that has been reduced in the sub scanning direction by deleting pixels. The image data 600 that has undergone the process is obtained by deleting pixels from the original image data 610 in such a manner that pixels of one scanning line are deleted at every eleventh scanning line. As the pixels are deleted, the subsequent pixels are shifted in the direction in which the image is reduced (reduction direction). Accordingly, the image data 600 is reduced by an amount of the deleted pixels (i.e., the number of pixels corresponding to the "reduction amount" in FIG. 14). However, in cases where the pixels are deleted at regular intervals as shown in the image data 600 that has undergone the process, the following problem may arise. That is, even if the positional displacement between the images can be corrected by deleting pixels, defective images may be formed due to the cycles in the pixel deleting operation. For example, there may be considerably visible streak-like irregularities in the density of the image, which are referred to as "banding".

Banding is heavily dependent on the visual properties of the human being. It is known that density irregularities are most noticeable at a spatial frequency falling in a range of approximately 5 through 10 cycles/deg (cycles per degree of visual angle). This corresponds to a spatial frequency falling in a range of 0.8 through 1.6 cycles/deg when the observation distance is 350 (mm). For example, by deleting pixels of one scanning line at every 48th scanning line, the image can be reduced by approximately 2%. However, when the resolution is 1200 dpi (dots per inch), density modulation of approximately one cycles/deg occurs. Accordingly, considerably visible banding is expected to appear.

In relation to image correction, Japanese Laid-Open Patent Application No. 2001-5245 (patent document 1) discloses an electrophotographic color image forming apparatus including plural photoconductors. For the purpose of correcting the difference between the widths in the main scanning direction of images of the respective colors, this image forming apparatus includes a displacement amount detecting unit for detecting the displacement amount of widths of the toner images corresponding to plural colors which are transferred onto a transfer material, and a displacement amount correcting unit for adding pixels to each of the image data items corresponding to the plural colors to make the toner images of the plural colors have the same widths, based on the displacement amount detected by the displacement amount detecting unit. Patent document 1 also describes that the pixels are added at random intervals to prevent patterns from appearing in any direction, thereby achieving color images of high printing quality.

Furthermore, Japanese Laid-Open Patent Application No. 2005-117615 (patent document 2) discloses an image forming apparatus including a screen processing unit for performing a screen process on the image data and a position correction unit for correcting color displacement (which occurs due to positional displacement) by adding or deleting pixels to/from the image data at predetermined arrangements. The screen processing unit applies a different screen in accordance with properties of each image region included in the image. The position correction unit adds or deletes pixels in arrangement cycles that do not match these screens within a range of less than or equal to 0.5 mm in the printed image.

A method of evaluating the extent of banding is disclosed in "Evaluation of Density Variations for a Thermal Recording System" written by Junichi Yoneda, FUJIFILM RESEARCH & DEVELOPMENT, No. 42, pp. 40-47, 1997 (nonpatent document 1). Also, in relation to image correction, Japanese Laid-Open Patent Application No. 2007-8132 (patent document 3) discloses a method of correcting scanning irregularities and scanning widths.

Patent document 1: Japanese Laid-Open Patent Application No. 2001-5245 (Japanese Patent No. 3539283)
Patent document 2: Japanese Laid-Open Patent Application No. 2005-117615
Patent document 3: Japanese Laid-Open Patent Application No. 2007-8132
Nonpatent document 1: "Evaluation of Density Variations for a Thermal Recording System" written by Junichi Yoneda, FUJIFILM RESEARCH & DEVELOPMENT, No. 42, pp. 40-47, 1997

As described above, several techniques have been proposed for mitigating banding in images as a result of image zooming processes performed by deleting pixels. However, in the conventional technology disclosed in patent documents 1 and 2, complex computing procedures and large memory space are required in order to determine the preferable positions from which pixels are to deleted, which leads to increased costs.

SUMMARY OF THE INVENTION

The present invention provides an image processing apparatus, an image forming apparatus, and a recording medium in which one or more of the above-described disadvantages are eliminated.

A preferred embodiment of the present invention provides an image processing apparatus, an image forming apparatus, and a recording medium, with which computing costs and memory costs for the image reduction correction can be prevented from increasing, and degradation in image quality can be mitigated.

According to an aspect of the present invention, there is provided an image processing apparatus for performing image reduction correction on target image data corresponding to pixels, including a deletion position specifying unit configured to specify, as deletion positions of deletion pixels in the target image data, predetermined positions in image regions including the pixels having gradation values that are more than or equal to a predetermined density; and a pixel deleting unit configured to delete the deletion pixels at the deletion positions specified by the deletion position specifying unit, and to shift the pixels subsequent to the deletion pixels in a reduction direction as the deletion pixels are deleted.

According to one embodiment of the present invention, an image processing apparatus, an image forming apparatus, and a recording medium are provided, with which computing costs and memory costs for the image reduction correction can be prevented from increasing, and degradation in image quality can be mitigated.

BRIEF DESCRIPTION OF THE DRAWINGS

Other objects, features and advantages of the present invention will become more apparent from the following detailed description when read in conjunction with the accompanying drawings, in which:

FIG. 10 illustrates the difference in perceived banding values between a case of deleting pixels from image portions and a case of deleting pixels from non-image portions;

DETAILED DESCRIPTION OF THE PREFERRED EMBODIMENTS

A description is given, with reference to the accompanying drawings, of embodiments of the present invention. The present invention is not limited to the following embodiments. In an embodiment the present invention, a multifunction peripheral (MFP) 100 having multiple image processing functions such as copying, fax transmission, scanning, and printing, is taken as an example of an image processing apparatus.

<Hardware Configuration and Image Forming Operations>

Figure 1:
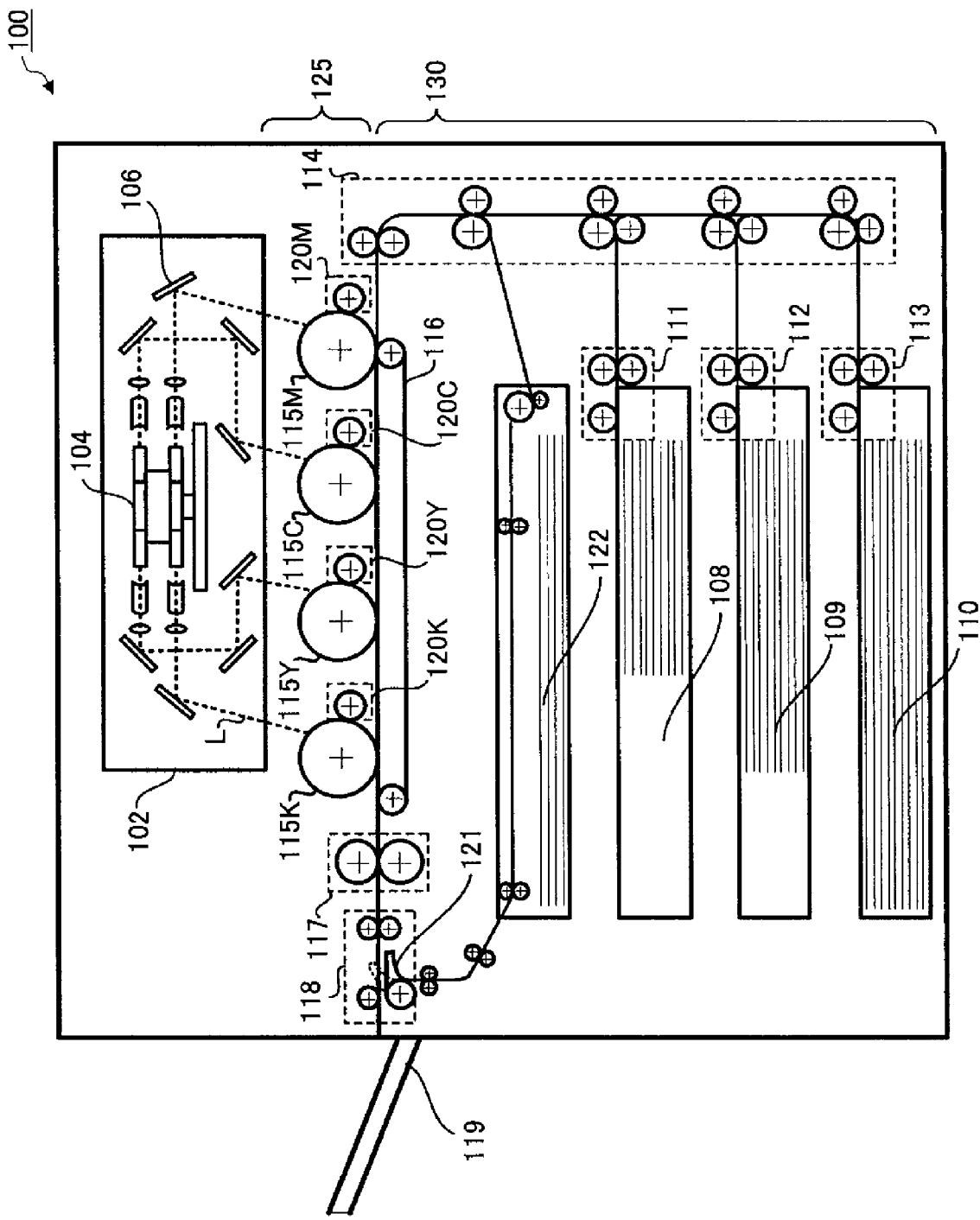
FIG. 1 illustrates a multifunction peripheral (MFP) according to an embodiment of the present invention.

FIG. 1 illustrates the MFP 100 according to an embodiment of the present invention. The MFP 100 shown in FIG. 1 includes an optical device 102 including optical elements such as a semiconductor laser element and a polygon mirror; an image creating unit 125 including a photoconductive drum, a charging device, and a developing device; and a transfer/fixing unit 130 including a fixing unit, a transfer belt, and an intermediate transfer belt.

The optical device 102 includes a laser output unit (not shown). A light beam radiated from the laser output unit is focused by a cylindrical lens (not shown), and is deflected by a polygon mirror 104 toward a reflection mirror 106. In the embodiment shown in FIG. 1, a light beam L is radiated for each of the colors of cyan (C), magenta (M), yellow (Y), and black (K). Each light beam passes through a focusing lens. Each of the photoconductive drums 115K through 115M is exposed to one of these light beams, so that an electrostatic latent image is formed thereon.

As each of the photoconductive drums 115 rotates, the formed electrostatic latent image is conveyed to a corresponding developing unit 120. At the developing unit 120, the electrostatic latent image is developed with the use of a developer, so that a developer image is formed and carried on the photoconductive drum 115. As each of the photoconductive drums 115 rotates, the developer image is conveyed to the transfer/fixing unit 130. The transfer/fixing unit 130 includes sheet feeding cassettes 108, 109, and 110; sheet feeding units 111, 112, and 113; a vertical conveying unit 114; a conveying belt 116; and a fixing unit 117. Each of the transfer members such as high-quality paper sheets and plastic sheets stacked in the sheet feeding cassettes 108, 109, and 110 is extracted by the sheet feeding units 111, 112, and 113, respectively, and is conveyed by the vertical conveying unit 114 to a position where it abuts one of the photoconductive drums 115.

Underneath a transfer bias potential, the developer image on each of the photoconductive drums 115 is transferred onto a transfer member that is electrostatically adhering to the conveying belt 116. After the developer images are transferred, the transfer member on which a superposed multicolor developer image is formed is supplied to the fixing unit 117. The fixing unit 117 includes fixing members such as fixing rollers made of silicon rubber or fluoro rubber. The fixing unit 117 applies heat and pressure to the transfer member and the multicolor developer image, in order to fix the image onto the transfer member. The heating process performed in this fixing operation may cause the transfer member to be slightly reduced in size.

After the fixing operation, the resulting printed matter is ejected onto a sheet eject tray 119 by a sheet eject unit 118. When double-sided printing is to be performed, a separation claw 121 is set upward, so that the printed matter is not guided onto the sheet eject tray 119, but is conveyed to a double-sided printing sheet feeding unit 122. Subsequently, the printed matter that has been conveyed to the double-sided printing sheet feeding unit 122 is extracted once again so that an image can be transferred onto its backside. Then, the separation claw 121 is set downward, so that the printed matter having images formed on both sides (double-sided printed matter) is ejected to the sheet eject tray 119.

The MFP 100 according to an embodiment of the present invention also includes an image scanning unit (not shown), and scans an original that has been conveyed onto the exposure glass by an ADF (Auto Document Feeder), although detailed descriptions are omitted.

Figure 2:
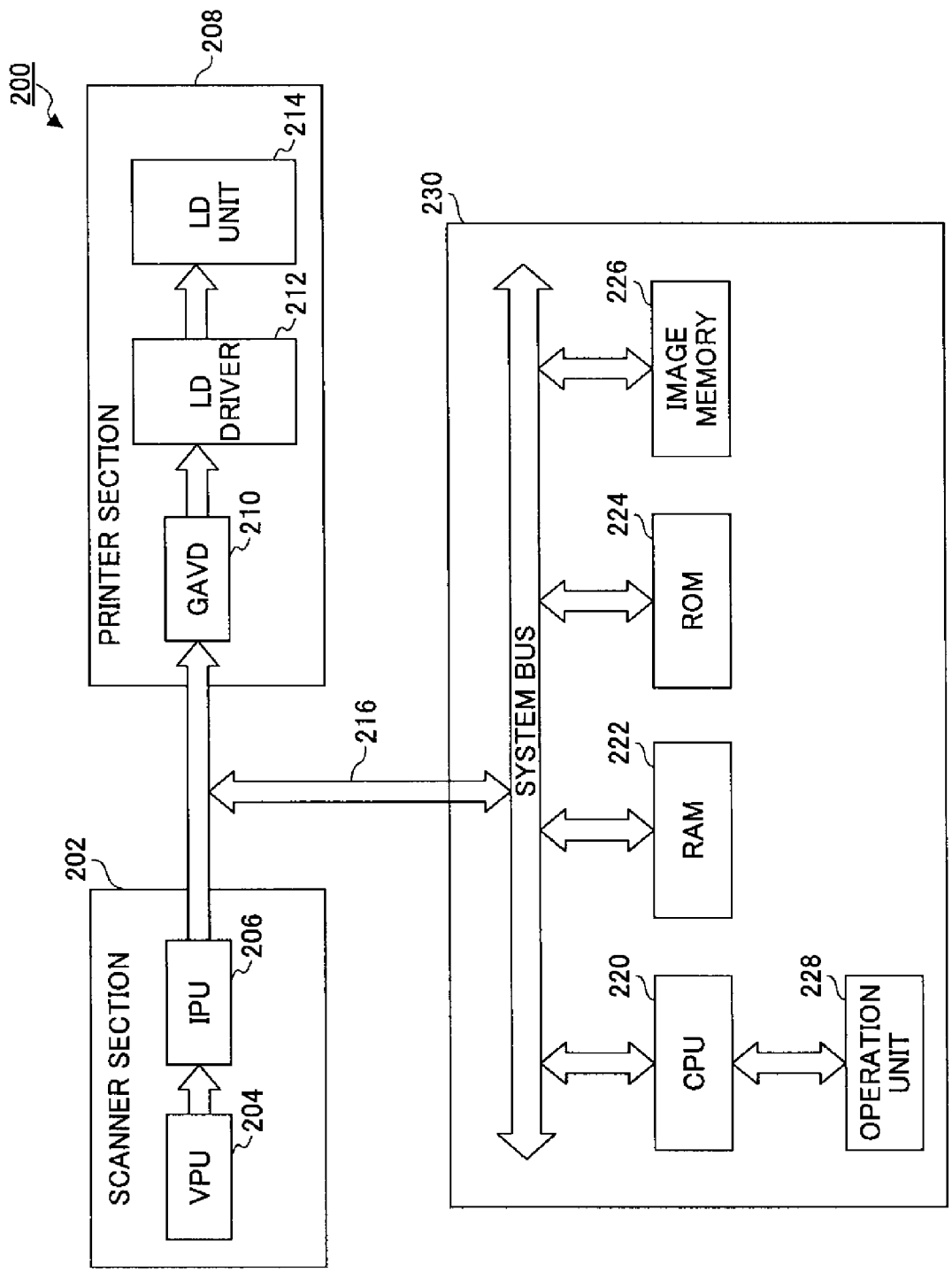
FIG. 2 is a schematic functional block diagram of a control unit of the MFP according to an embodiment of the present invention.

FIG. 2 is a schematic functional block diagram of a control unit 200 of the MFP 100. The control unit 200 includes a scanner section 202, a printer section 208, and a main control section 230. The scanner section 202 functions for scanning images, and includes a VPU (Video Processing Unit) 204 and an IPU (Image Processing Unit) 206. The VPU 204 performs A/D conversion on signals scanned by a scanner (not shown) to implement black offset correction, shading correction, and pixel position correction. The IPU 206 performs predetermined image processing on the acquired image. The scanned image acquired by the scanner section 202 is sent as digital data to the printer section 208, immediately after being acquired or after being temporarily saved in an image memory.

The printer section 208 includes a GAVD (Gate Array Video Driver) 210, a LD (Laser Diode) driver 212, and a LD unit 214. The GAVD 210 controls all units of the printer section 208 in accordance with image data input from the scanner section 202 or the image memory. The LD driver 212 supplies a current to a semiconductor laser element to drive the semiconductor laser element, in accordance with signals output from the GAVD 210. The LD unit 214 has the semiconductor laser element mounted thereon, and focuses the electrostatic latent image onto the photoconductive drum.

The scanner section 202 and the printer section 208 are connected to the main control section 230 via an interface 216. The image scanning operations and image forming operations are controlled by commands from the main control section 230. The main control section 230 includes a CPU (Central Processing Unit) 220; a ROM (Read Only Memory) 224 for storing initial setting data of the CPU 220, control data, and programs so as to be used by the CPU 220; a RAM (Random Access Memory) 222 for providing processing space to be used by the CPU 220; and an image memory 226 for storing image data, which are interconnected by a system bus. Any conventional CPU can be used as the CPU 220, for example, a CPU of the PENTIUM (registered trademark) series, or a CPU that is compatible with the PENTIUM (registered trademark) series.

The main control section 230 includes an operation unit 228 which receives instructions input by the operator. With the use of the operation unit 228, the operator can set printing parameters such as the sheet feeding tray, the density, instructions for double-sided printing, the number of copies to be printed, and can instruct the MFP 100 to start a process. The CPU 220 receives a command from the operator via the operation unit 228, invokes a program module for executing a process corresponding to the command, and causes the program module to execute a process such as copying, fax transmission, scanning, and image storage. For example, when a request to start a copying process is received, the CPU 220 instructs the scanner section 202 to execute an image scanning process and output the image data obtained by scanning the image to the printer section 208 together with printing parameters, and gives a command for executing an image forming process.

When outputting the image data acquired with the scanner section 202 to the photoconductive drum 115 as an electrostatic latent image by driving the printer section 208, the CPU 220 executes a sub scanning position control operation on the transfer member such as a high-quality paper sheet or a plastic sheet. When the scanning operation is performed in the sub scanning direction, the CPU 220 outputs a start signal to the GAVD 210. The GAVD 210 uses this start signal as a reference to read the image data stored in a buffer memory, processes the image data in units of scanning lines in the main scanning direction, and outputs drive control signals for the LD unit 214 to the LD driver 212 to turn on the semiconductor laser element of the LD unit 214.

The main control section 230 can have a parallel interface (I/F) such as IEEE 1294 (Institute of Electrical and Electronic Engineers 1294) and USB (Universal Serial Bus), or a network interface (I/F) for connecting to Ethernet (registered trademark). The printer section 208 can receive image data from a host computer and execute an image forming process.

Figure 3:
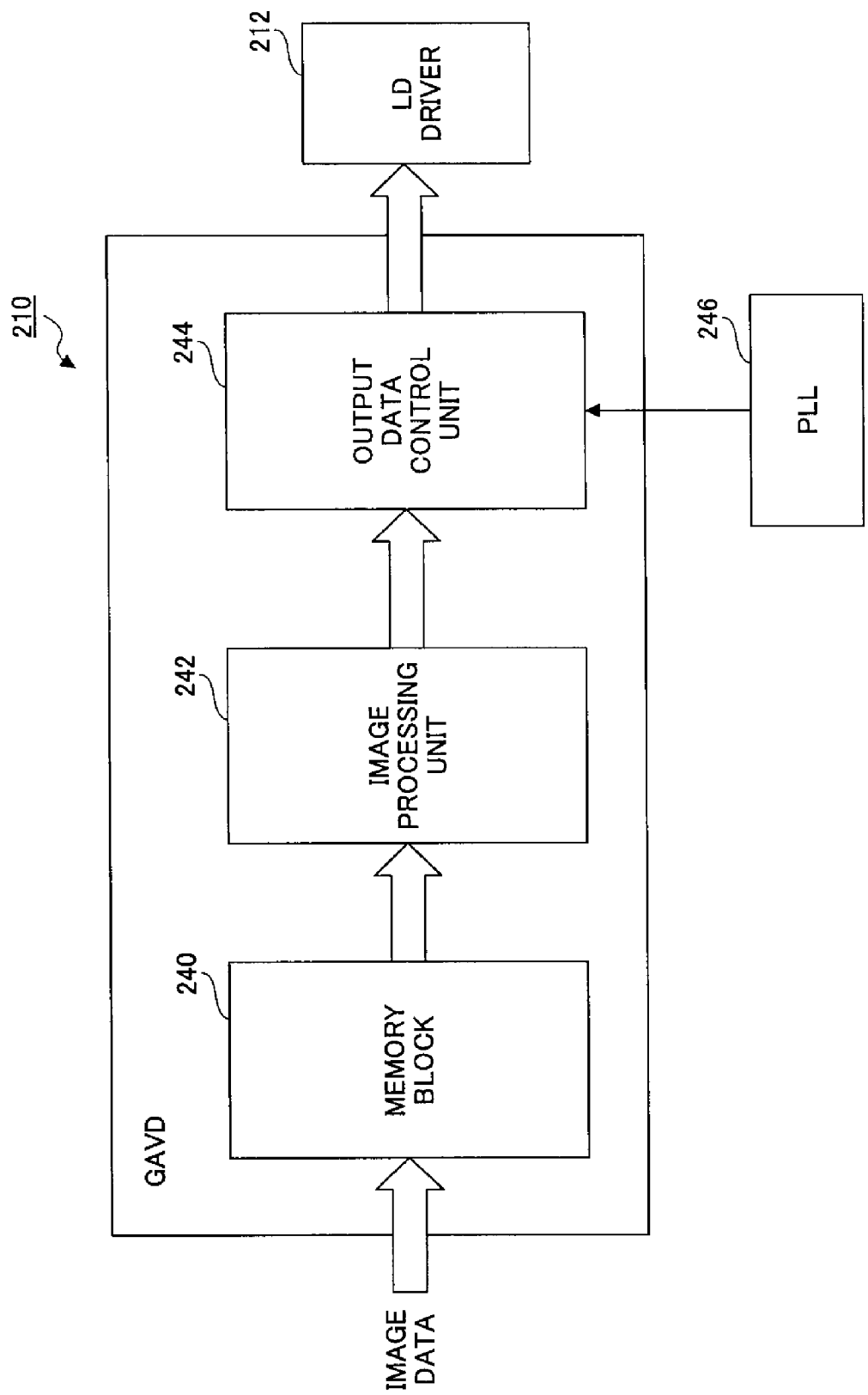
FIG. 3 is a functional block diagram of a GAVD shown in FIG. 2 in more detail.

FIG. 3 is a functional block diagram of the GAVD 210 in more detail. The GAVD 210 includes a memory block 240 for storing input image data. The GAVD 210 performs speed conversion and format conversion on the input image data, and passes the converted image data to an image processing unit 242. The image processing unit 242 reads the image data from the memory block 240, and executes a resolution conversion process on the image data, a screen process, or an image reduction correction process by deleting pixels. The position at which the image data is exposed on the photoconductive drum 115 is defined by a main scanning line address value specifying a position in the main scanning direction, and a sub scanning line address value specifying a position in the sub scanning direction.

An output data control unit 244 generates drive control signals corresponding to the image data generated by the image processing unit 242, and transmits the drive control signals to the LD driver 212. The LD driver 212 that has received the drive control signals drives the LD unit 214 and controls the light emitting time of the semiconductor laser element in accordance with the drive control signals corresponding to the image data and a PLL (Phase Locked Loop) 246, following an operation clock having phases set for each of the scanning lines. Accordingly, the LD driver 212 controls the electrostatic latent image on the photoconductive drum 115 by each main scanning line.

<Image Reduction Correction Process: Part 1>

Figure 4:
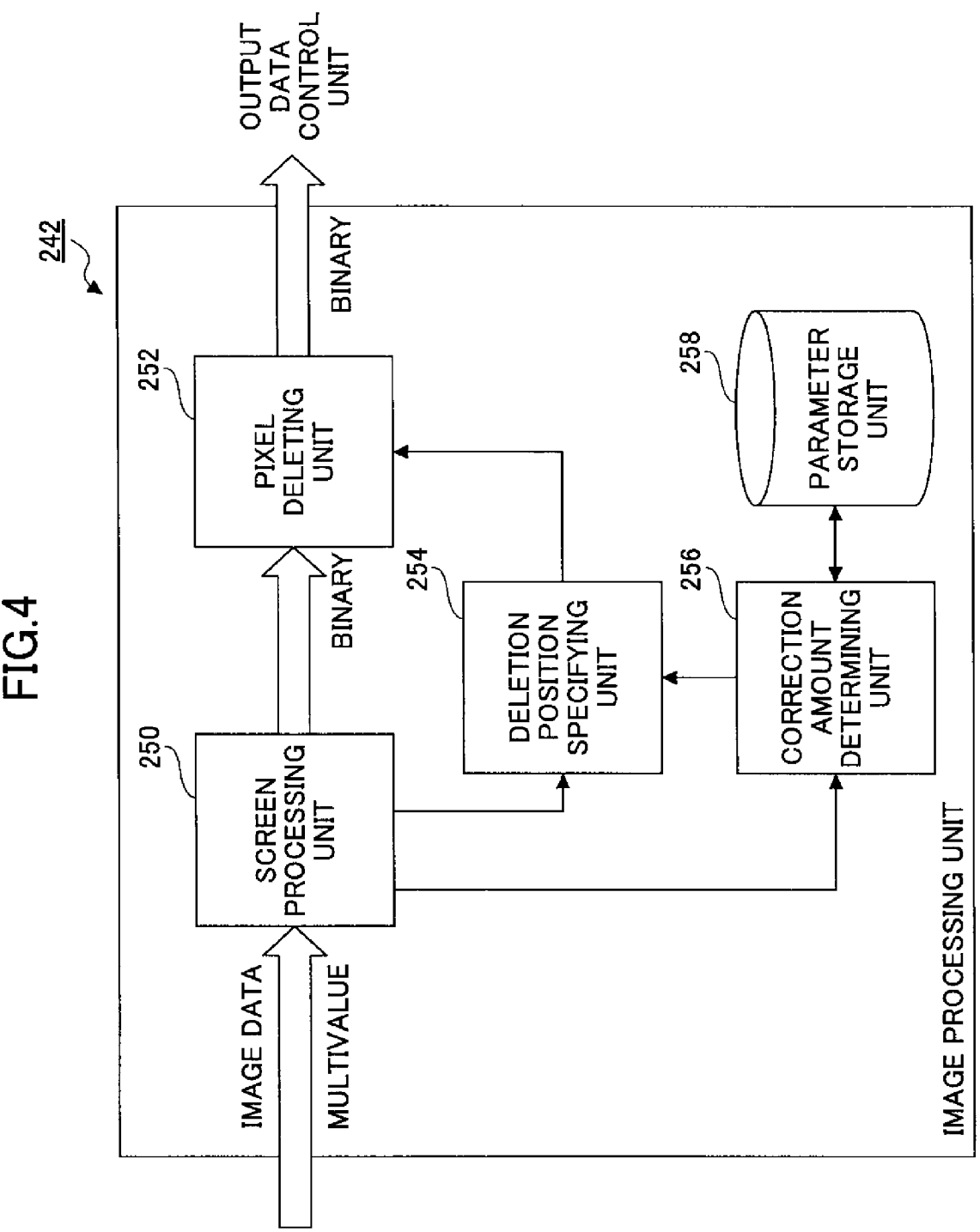
FIG. 4 illustrates the data flow in an image processing unit according to an embodiment of the present invention.

Details of an image reduction correction process are described below. FIG. 4 illustrates the data flow in the image processing unit 242 shown in FIG. 3. The image processing unit 242 includes a screen processing unit 250, a pixel deleting unit 252, a deletion position specifying unit 254, a correction amount determining unit 256, and a parameter storage unit 258. The image processing unit 242 performs a screen process and an image reduction correction process, by deleting pixels, on the original image data acquired from the memory block 240. Then, the image processing unit 242 outputs, to the output data control unit 244, the image data that has undergone the processes.

In the present embodiment, the original image data input to the screen processing unit 250 is expressed by multi-value gradations. The screen processing unit 250 executes screening with a predetermined screen pattern on the original image data items of the respective colors, generates image data of predetermined resolution, and outputs the image data to the pixel deleting unit 252. The screen processing unit 250 outputs, to the correction amount determining unit 256, property values (pattern properties) including the type of screen pattern such as parallel lines or dots and the number of screen lines. The screen processing unit 250 outputs, to the deletion position specifying unit 254, the property values and phase information of the pattern. The phase information is the reference information used by the deletion position specifying unit 254 to identify the image region of the screen pattern applied by the screen processing unit 250.

The parameter storage unit 258 stores an LUT (Look Up Table). In the LUT, the types of transfer members are associated with reduction ratios calculated based on the expected reduction amount for each of the transfer member types. The reduction ratio of the main scanning direction and the reduction ratio of the sub scanning direction can be stored separately. The purpose of the image reduction correction process according to the present embodiment is not particularly limited.

The correction amount determining unit 256 obtains the intervals at which pixels are to be deleted (deletion intervals), which are defined by the cycles of the screen pattern. The deletion intervals are obtained by using, as a search key, the identification value indicating the type of the transfer member specified by the printing parameter. With the use of this search key, the deletion intervals are obtained in accordance with the reduction ratio acquired from a backup table, a property value of the screen pattern input from the screen processing unit 250, and the resolution of the image data. The obtained deletion intervals are output to the deletion position specifying unit 254. The deletion intervals can be calculated with an appropriate computing unit. In other embodiments, the deletion intervals can be obtained by referring to a predetermined look up table associating representative values of the above parameters with deletion intervals.

The deletion position specifying unit 254 specifies the appropriate positions from which pixels are to be deleted (deletion positions) based on the property values and phase information of the input screen pattern, and the deletion intervals of the pixels input from the correction amount determining unit 256. Then, the deletion position specifying unit 254 outputs the deletion position information to the pixel deleting unit 252. In accordance with the deletion position information input from the deletion position specifying unit 254, the pixel deleting unit 252 deletes, from the image data input from the screen processing unit 250, the pixel data corresponding to the deletion positions. As the pixel data is deleted, the pixel deleting unit 252 controls the image data so that the pixels subsequent to the deleted pixels are shifted in the direction in which the image is reduced.

Figure 5:
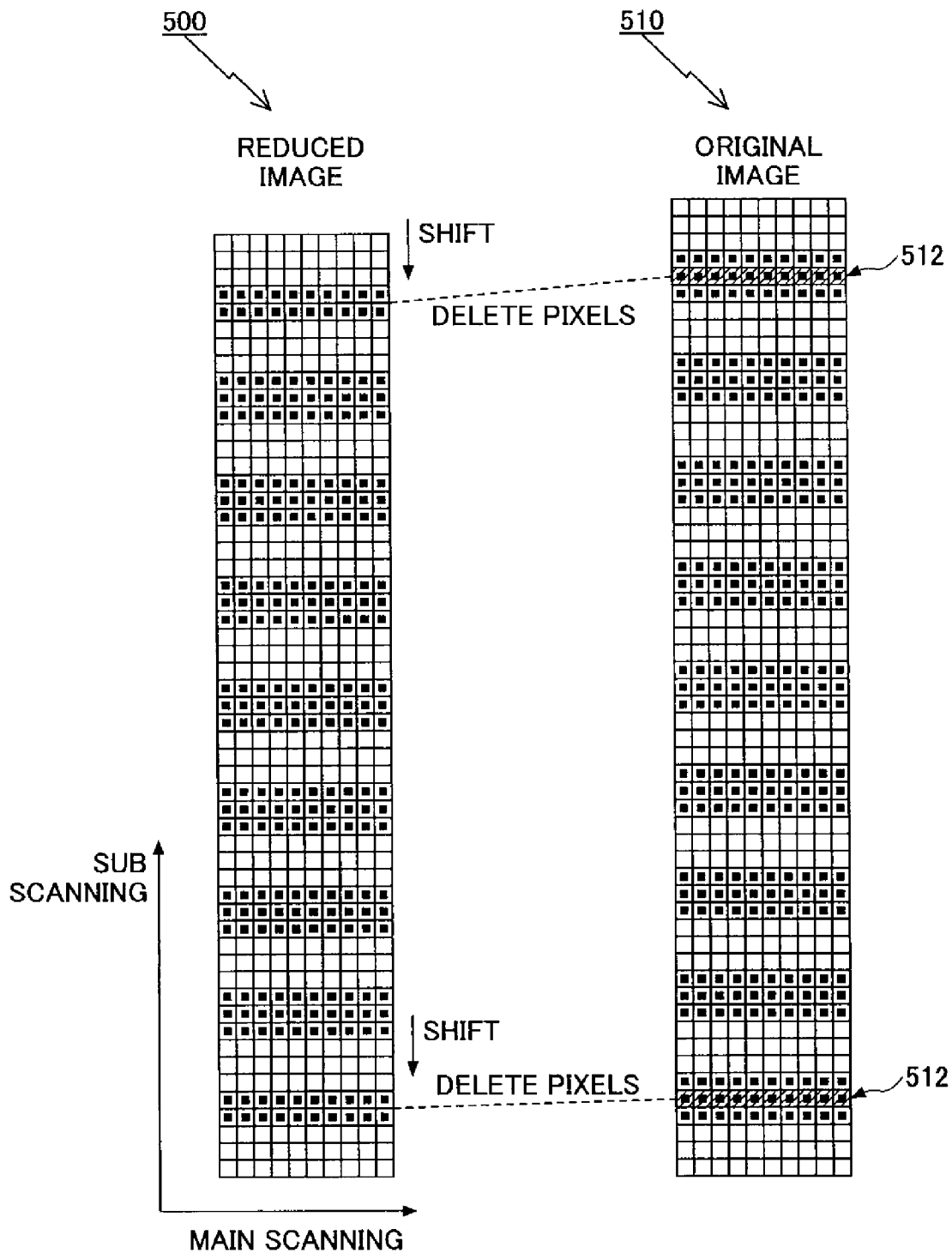
FIG. 5 illustrates an example of pixel deletion.

In the following, a description is given of the method of specifying the deletion positions with reference to an example of pixel deletion. FIG. 5 illustrates an example of pixel deletion. FIG. 5 shows images corresponding to image data including two-dimensional arrangements of pixels, where the pixels are represented by squares "□". A pixel with a black square "■" indicates that the pixel has a gradation value corresponding to an image portion on the transfer member to which toner is to be transferred (pixel having a gradation value of more than or equal to a predetermined density). The pixels other than those with the black squares have gradation values corresponding to non-image portions (portions without images).

Image data 510 shown in FIG. 5 ("original image" in FIG. 5) is an example of data of an image before deleting pixels. Image data 500 shown in FIG. 5 ("reduced image" in FIG. 5) is an example of data of an image that has been reduced in the sub scanning direction by deleting pixels. The image data 510 has resolution of 1200 dpi, which has undergone a line screen process so that there are 200 screen lines (lines per inch) parallel to the main scanning direction. The resolution is defined by the number of pixels per unit length, which can be the same or different in the main scanning direction and the sub scanning direction; however, as a matter of convenience, the resolution is the same in the main scanning direction and the sub scanning direction in the present embodiment.

In the image data 500 shown in FIG. 5 that has undergone the process, deletion pixels 512 (pixels to be deleted) corresponding to one scanning line are deleted at every 8 screen cycles, and the image data 510 has been reduced by approximately 2% along the sub scanning direction. That is, the image data 500 that has undergone the process is obtained by deleting the pixels at predetermined positions from image regions including pixels corresponding to image portions (image regions including pixels such as lines with gradation values of more than or equal to a predetermined density) in the image data 510 that has not undergone the process. Then, the pixel lines at main scanning line addresses subsequent to the deleted pixels are shifted along the sub scanning direction which is the reduction direction (indicated by an arrow "shift" in FIG. 5).

The correction amount determining unit 256 shown in FIG. 4 calculates a number of pixels n per screen cycle along the sub scanning direction which is the reduction direction, based on the resolution and the number of screen lines. Then, the correction amount determining unit 256 calculates a number of screen cycles N at which each scanning line of pixels is to be deleted, so as to achieve the reduction ratio. The deletion position specifying unit 254 identifies the image regions corresponding to image portions and the image regions corresponding to the non-image portions, based on the number of pixels n per screen cycle and the phase information input from the screen processing unit 250. Then, the deletion position specifying unit 254 specifies the deletion positions from which pixels are to be deleted, within the image regions corresponding to the image portions. For example, the deletion position specifying unit 254 counts the number of screen cycles with a counter, and for every N screen cycles, the deletion position specifying unit 254 specifies a predetermined position within an image region corresponding to a image portion, as a deletion position. The predetermined position can be at any position as long as it is within an image region corresponding to an image portion, such as substantially in the middle of an image region corresponding to an image portion (pixel position around the center of an image region), or a pixel position adjacent to an image region corresponding to a non-image portion. Furthermore, the following is an example of a method of specifying the predetermined positions at fixed deletion intervals. That is, it is assumed that each predetermined position is to be substantially in the middle of one of the image regions. When the length of the image region in a predetermined reduction direction corresponds to an even number of pixels, the position that divides the image region into two is specified as the predetermined position (deletion position). When the length of the image region in a predetermined reduction direction corresponds to an odd number of pixels, a quotient Q is obtained by dividing the number of pixels M corresponding to the length of the image region by two, and the position that divides the image region into a region having a length of Q pixels and a region having a length of (M−Q) pixels is specified as the predetermined position (deletion position). The pixel deleting unit 252 processes the image data in units of each scanning line, and deletes the pixels corresponding to the deletion position specified by the deletion position specifying unit 254. Accordingly, the image data can be reduced along the sub scanning direction.

In the example shown in FIG. 5, pixels corresponding to one scanning line are deleted for every eight screen cycles to perform the image reduction correction at a reduction ratio of approximately 98%. However, in the present embodiment, the image reduction correction is not limited to the method of deleting pixels corresponding to one scanning line for every N screen cycles, to reduce the image at a reduction ratio of $\{1+1/(N \times n+1)\} \times 100\%$. For example, by combining procedures of deleting pixels corresponding to one scanning line for every $N_1$ screen cycles and procedures of deleting pixels corresponding to one scanning line for every $N_2$ screen cycles, the desired reduction ratio can be attained with higher precision without the need of complex calculations.

By deleting pixels by combining the functions of the above units, the image data can be reduced by a reduction ratio and corrected in a preferable manner. Furthermore, the image processing unit 242 is holding a reduction ratio which is specified in consideration of how much the transfer member is reduced by the fixing/heating operation. Therefore, when double-sided printing is specified, the positional displacement between images formed on the two sides of the sheet can be preferably mitigated by performing image reduction correction when printing an image on the second side of the sheet. Furthermore, in the above-described example, the image reduction correction is performed along the sub scanning direction. However, it is also possible to perform the image reduction correction along the main scanning direction in a similar manner.

<Image Reduction Correction Process: Part 2>

Figure 6:
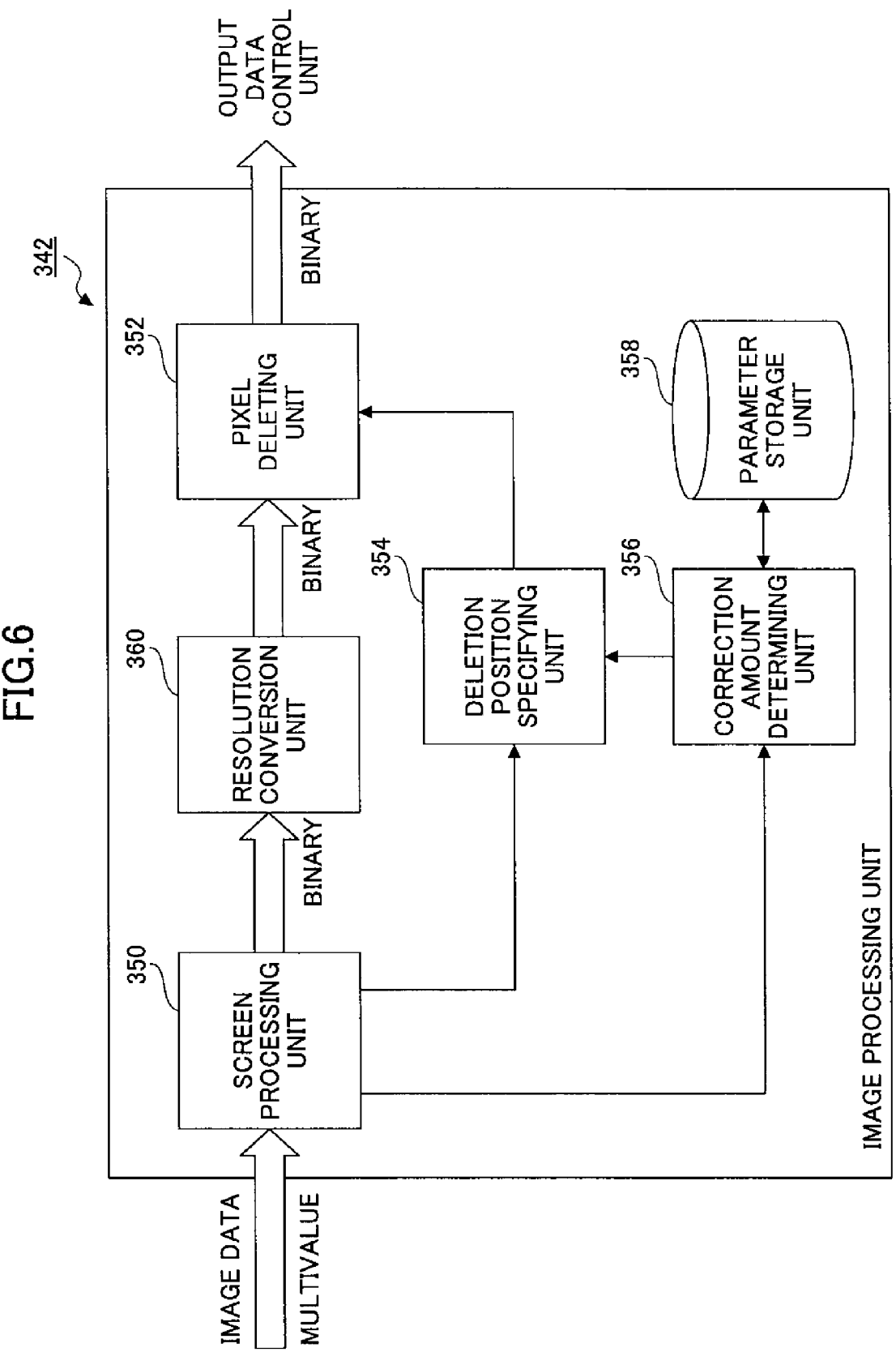
FIG. 6 illustrates another example of the data flow in the image processing unit.

Another embodiment of the image reduction correction process is described below. FIG. 6 illustrates another example of the data flow in the image processing unit 242 shown in FIG. 4. An image processing unit 342 includes a screen processing unit 350, a resolution conversion unit 360, a pixel deleting unit 352, a deletion position specifying unit 354, a correction amount determining unit 356, and a parameter storage unit 358. The image processing unit 342 performs a screen process, a resolution increasing process, and an image reduction correction process, by deleting pixels, on the original image data acquired from the memory block 240. Then, the image processing unit 342 outputs, to the output data control unit 244, the image data which has undergone the processes.

Similar to the embodiment shown in FIG. 4, the screen processing unit 350 executes screening on the original image data items of the respective colors, generates image data of predetermined resolution which has been binarized, and outputs the generated image data to the resolution conversion unit 360. Furthermore, the screen processing unit 350 outputs, to the correction amount determining unit 356, property values of a screen pattern. The screen processing unit 350 outputs, to the deletion position specifying unit 354, property values of the pattern and phase information.

The resolution conversion unit 360 increases the resolution of the input image data by dividing the pixels, and outputs this to the pixel deleting unit 352. For example, for image data having input resolution of 1200 dpi, the resolution conversion unit 360 divides each main scanning line address and each sub scanning line address by four. Accordingly, the resolution of this image data can be converted to 4800 dpi. In this case, each pixel in the input image data is divided into 4×4 pixels, and the pixels obtained as a result of the division can have the same gradation values.

The parameter storage unit 358 has the same functional configuration as that of FIG. 4, and is thus not further described. The correction amount determining unit 356 obtains the deletion intervals of the pixels defined by screen cycles, in accordance with the reduction ratio obtained from the look up table, the property values of the screen pattern input from the screen processing unit 350, and the resolution of the image data after the resolution conversion. Then, the obtained deletion intervals are output to the deletion position specifying unit 354.

The deletion position specifying unit 354 specifies the preferable pixel deletion positions based on the property values and the phase information of the screen pattern input from the screen processing unit 350, and the deletion intervals of the pixels input from the correction amount determining unit 356. Then, this deletion position information is output to the pixel deleting unit 352. The pixel deleting unit 352 deletes the pixels at the deletion positions from the image data input from the resolution conversion unit 360, in accordance with the deletion position information input form the deletion position specifying unit 354. As the pixels are deleted, the subsequent pixels are shifted in the reduction direction. The following is an additional description of the method of specifying the deletion positions according to the present embodiment, with reference to an example of pixel deletion.

Figure 7:
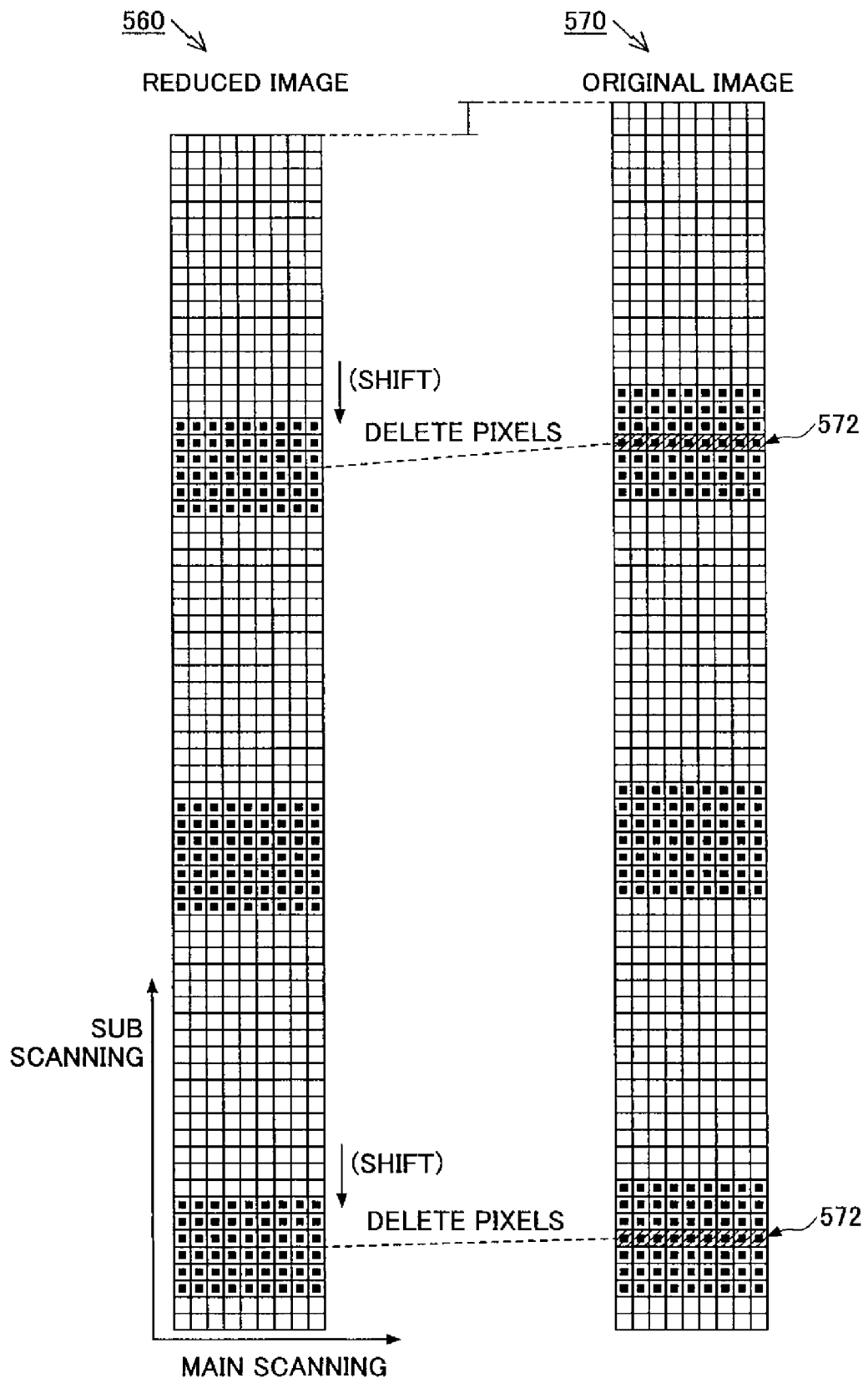
FIG. 7 illustrates an example of pixel deletion in a case where the resolution is converted.

FIG. 7 illustrates an example of pixel deletion in a case where the resolution is converted. High resolution image data 570 ("original image" in FIG. 7) is an example of data of an image whose resolution has been increased but has not yet undergone the pixel deletion process. Image data 560 ("reduced image" in FIG. 7) is an example of data of an image that has been reduced along the sub scanning direction by deleting pixels. The image data 570 is obtained by increasing the resolution of original image data, which has a resolution of 1200 dpi and which has undergone a line screen process so that there are 200 screen lines (lines per inch) parallel to the main scanning direction. Specifically, to increase the resolution, the pixel density is multiplied by four in both the main scanning direction and the sub scanning direction.

To obtain the image data 560 shown in FIG. 7 that has undergone the process, deletion pixels 572 corresponding to one scanning line have been deleted at every 2 screen cycles so that the image data 570 is reduced by approximately 2% along the sub scanning direction, similar to the case of FIG. 5. That is, the image data 560 that has undergone the process is obtained by deleting the pixels at predetermined positions from image regions including pixels corresponding to image portions in the image data 570 that has not undergone the process. Then, the subsequent pixel lines are shifted along the sub scanning direction which is the reduction direction.

Figure 8:
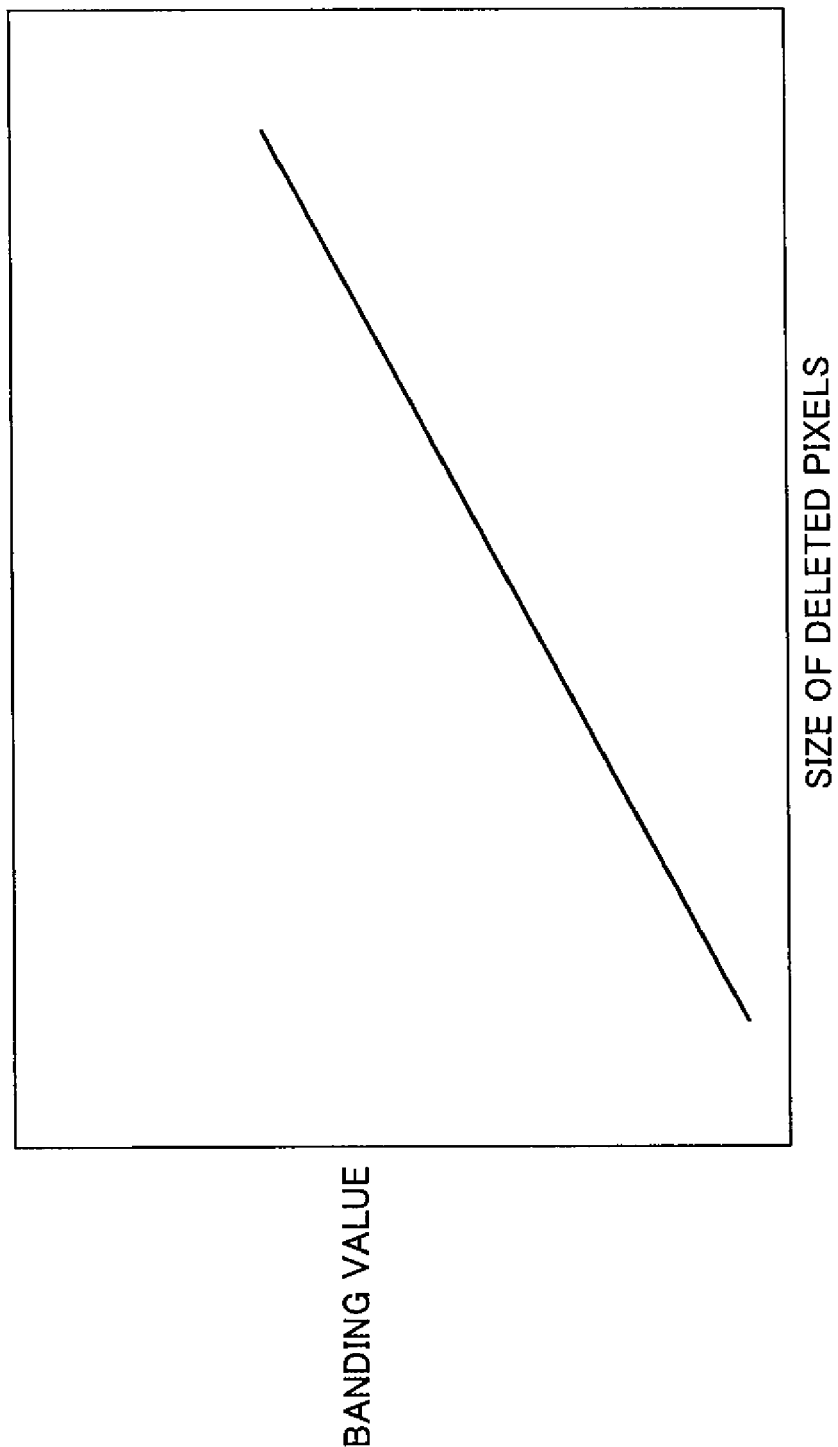
FIG. 8 shows the relationship between the sizes of the deleted pixels and perceived banding values.
Figure 9:
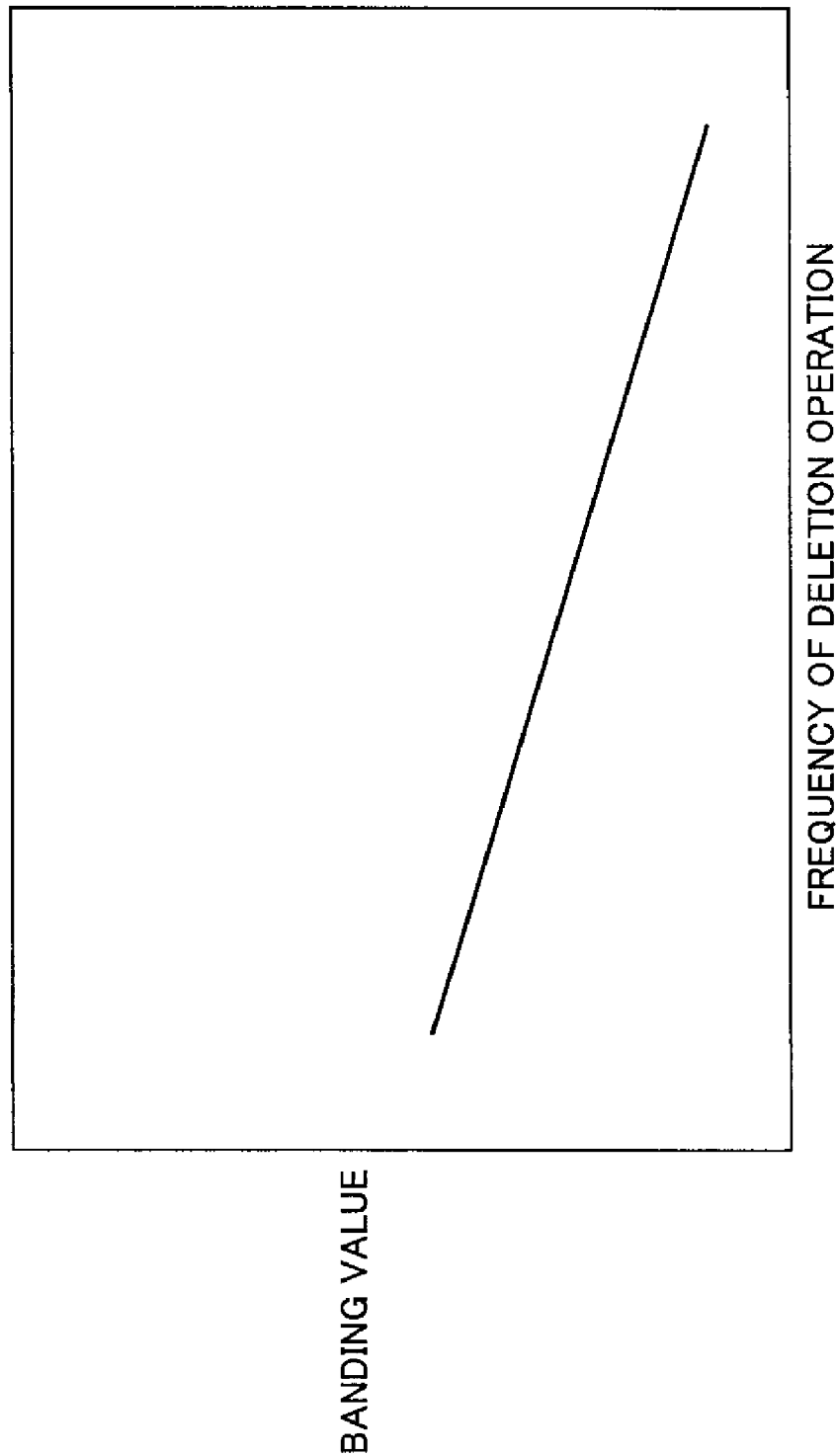
FIG. 9 shows the relationship between the frequencies of the pixel deletion operation and perceived banding values.

FIG. 8 shows the relationship between the sizes of the deleted pixels and banding values. FIG. 9 shows the relationship between the pixel deletion operations and banding values. The "banding value" refers to a value obtained by performing the calculation method for banding values disclosed in the evaluation method of nonpatent document 1. As the banding values thus calculated become higher, banding (streak-like density irregularities) becomes more noticeable.

In view of the above properties of banding values, as the sizes of the deletion pixels increase, the banding values become higher, as illustrated in FIG. 8. This means that when one pixel is deleted at intervals of the same number of screen cycles from each of an image of 600 dpi and an image of 1200 dpi, banding is less noticeable in the image of 1200 dpi. As illustrated in FIG. 9, when one pixel is deleted from each of images having the same resolution, as the pixel deletion operation is performed in cycles of a higher frequency, banding becomes less noticeable.

Similar to the case of FIG. 5, in the processed image data 560 shown in FIG. 7, one row of pixels is deleted at every 48 pixel rows. However, each deleted pixel is smaller than that of FIG. 5, and therefore banding is less noticeable. Furthermore, due to the high resolution conversion process, the pixel deletion operations are performed at a higher frequency, and therefore banding in the image can be mitigated even more.

The correction amount determining unit 356 shown in FIG. 6 calculates a number of pixels n' per screen cycle along the sub scanning direction which is the reduction direction, based on the converted resolution and the number of screen lines. Then, the correction amount determining unit 356 calculates a number of screen cycles N' at which each scanning line of pixels is to be deleted, so as to achieve the intended reduction ratio. The number of pixels n' corresponds to a value obtained by multiplying the number of pixels n of the image data before undergoing the high resolution conversion process, by a multiple density P corresponding to the increased resolution. The deletion position specifying unit 354 identifies the image regions corresponding to image portions and the image regions corresponding to the non-image portions, based on the number of pixels n' per screen cycle and the phase information input from the screen processing unit 350. Then, the deletion position specifying unit 354 specifies each of the deletion positions at every N' screen cycles, within the image regions corresponding to image portions. Accordingly, the image data can be reduced along the sub scanning direction.

The image reduction correction process according to the above embodiment is particularly effective for line screens perpendicular or parallel to the scanning direction or dot screens. Generally, banding tends to be notable in images expressed by lines or dots. However, in the image reduction correction according to the present embodiment, banding can be mitigated in a preferable manner, without incurring additional computing costs or memory costs.

FIG. 10 illustrates simulation results obtained by evaluating the banding values with respect to different sizes of pixels deleted in the same cycle. The solid line indicates a case where pixels are deleted from a non-image portion (white pixels) and the dashed line indicates a case where pixels are deleted from an image portion (black pixels). The "banding values" shown in FIG. 10 are calculated by the same method as that described with reference to FIGS. 8 and 9.

Referring to FIG. 10, in both cases, as the sizes of the deleted pixels increase, the banding values increase. However, when the pixel sizes are the same in both cases, the banding value is lower for the case of deleting pixels from the image portions, compared to the case of deleting pixels from the non-image portions. Accordingly, banding is mitigated when the pixels are deleted from the image portions.

The output image has white streaks when pixels are deleted from the image portions, and the image has black streaks when pixels are deleted from the non-image portions. In addition to the change in the area ratio, the optical dot gain has an impact, and therefore the black streaks cause the density to vary more than the white streaks. This is why banding is presumed to become worse in the case of deleting pixels from the non-image portions.

A description is given of the image reduction correction process with reference to experiments.

<Experiment 1> Image Reduction Correction

An experiment was conducted to verify the differences in the effects of mitigating banding according to differences in gradation values of the deleted pixels (deleted pixels included in image portion and deleted pixels included in non-image portions). Image data for simulating a screen process and an image reduction correction process was created, an image forming process was performed with the created image data, and the formed image was inspected by eyesight to evaluate the extent of banding. The experiment was conducted under the following conditions.

(Experiment Conditions)

For the image forming operation, a modified device of imagio Neo C285 (registered trademark) was used, which is an electrophotographic MFP (hereinafter, "evaluation device"). The image data used for the image forming operation had a screen pattern applied, having resolution of 1200 dpi and a density of 200 screen lines (lines per inch) parallel to the main scanning direction, in a monochrome binarized expression.

Figure 11A:
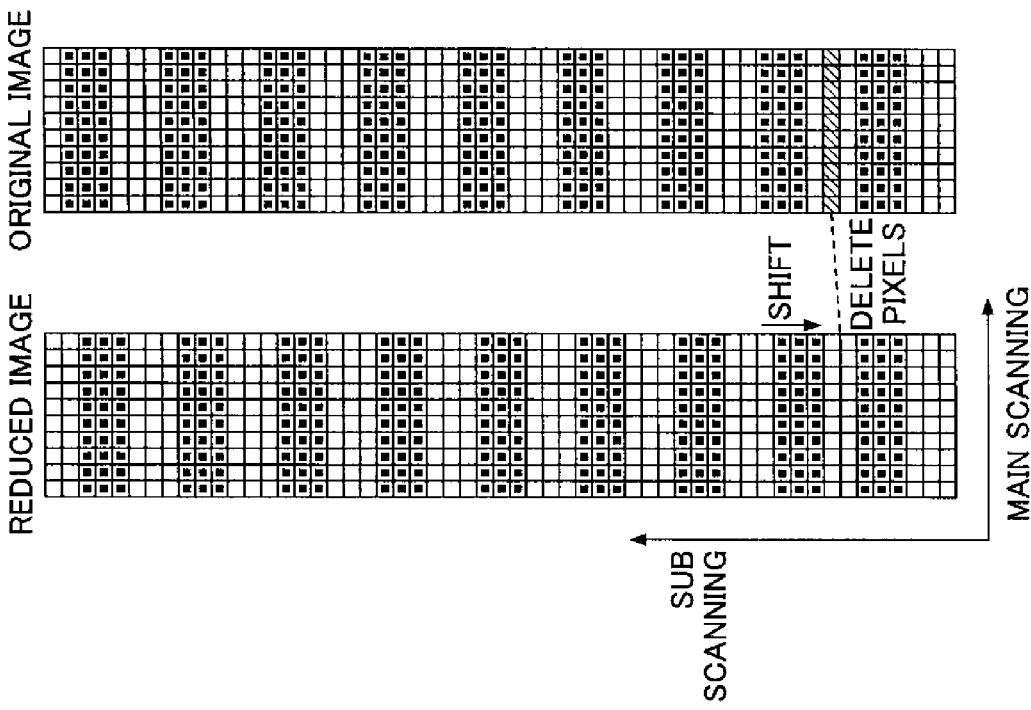
FIGS. 11A and 11B schematically illustrate the image data before pixel deletion and after pixel deletion.
Figure 11B:
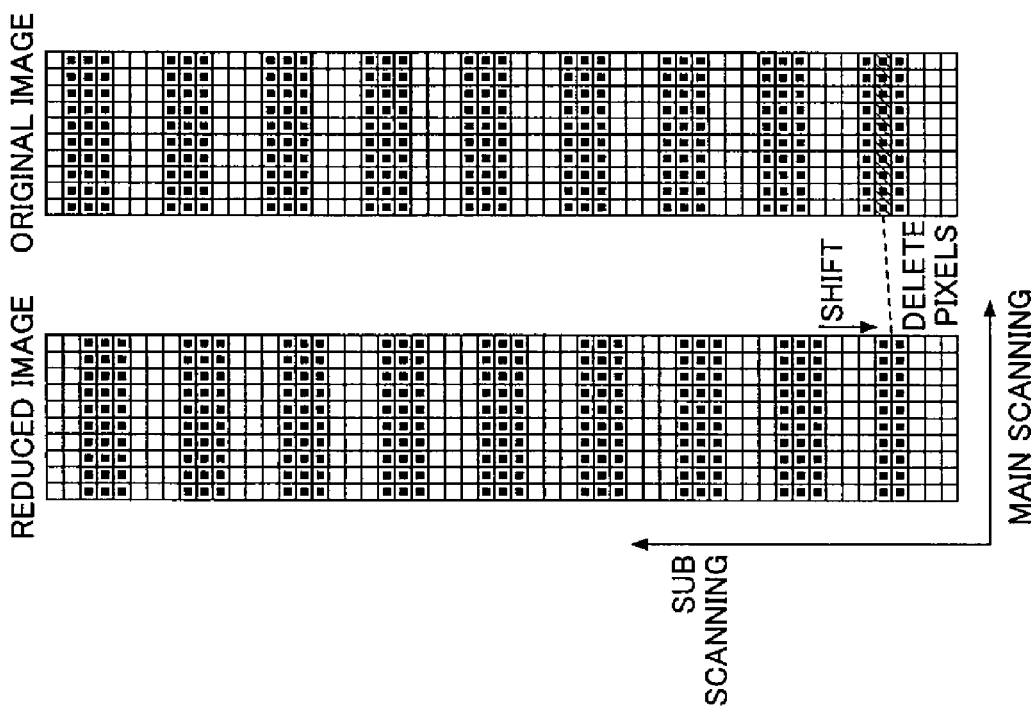

FIGS. 11A and 11B schematically illustrate the image data before pixel deletion and after pixel deletion. FIGS. 11A and 11B illustrate the image data before pixel deletion ("original image" in FIGS. 11A and 11B) including three scanning lines (lines including black pixels) in every six scanning lines, and the image data after pixel deletion ("reduced image" in FIGS. 11A and 11B). Two examples of pixel deletion operations for image reduction correction are illustrated in FIGS. 11A and 11B. FIG. 11A illustrates a case where the pixels included in the image portions ("■" in FIGS. 11A and 11B) are deleted to perform the image reduction correction process. FIG. 11B illustrates a case where the pixels included in the non-image portions ("□" in FIGS. 11A and 11B) are deleted to perform the image reduction correction process. The image data after pixel deletion (hereinafter, "reduced image data") is reduced by approximately 2% along the sub scanning direction, compared to the image data before pixel deletion.

In Experiment 1 conducted under the above conditions, the extent of banding in the formed images output from the evaluation device was evaluated for the reduced image data that had undergone the image reduction correction process by the methods illustrated in FIGS. 11A and 11B.

(Experiment Results)

Table 1 shows the evaluation results for the images formed with the reduced image data illustrated in FIGS. 11A and 11B. Banding was evaluated by having the same examiner inspect the two images output from the evaluation device formed by the methods illustrated in FIGS. 11A and 11B. The levels of inspected evaluation are indicated by using a five-point scale ranging from "very good" when the streak-like density irregularities cannot be observed to "very poor" when the streak-like density irregularities can be observed and appear to be unpleasant, with "good", "average", and "poor" in between.

TABLE 1

|  | FIG. 11A | FIG. 11B |
| --- | --- | --- |
| Inspected evaluation | Poor | Very poor |

According to the results shown in Table 1, the inspected evaluation is higher for the method of deleting the pixels corresponding to lines of black pixels (deleting pixels from the image portion) than for the method of deleting white pixels (deleting pixels from the non-image portion). Therefore, banding (streak-like density irregularities) can be mitigated more by deleting black pixels.

<Experiment 2> Image Reduction Correction after High Resolution Conversion

An experiment was conducted to verify the differences in the effects of mitigating banding according to differences in the positions of the deleted pixels (gradation values of deleted pixels), when image reduction correction is performed after high resolution conversion. Image data with increased resolution for simulating a screen process and an image reduction correction process was created, an image forming process was performed with the created image data, and the formed image was inspected by eyesight to evaluate banding. In Experiment 2, banding was evaluated for an image formed on one side of a sheet based on the image data (single-sided printing) and output from the evaluation device, similar to Experiment 1. Furthermore, in Experiment 2, banding was evaluated for images formed on both sides of a sheet (double-sided printing).

<<Experiment 2-1>> Single-Sided Output

The experiment was conducted under the following conditions.

(Experiment Conditions)

For the image forming operation, the same evaluation device as that used in Experiment 1 was used. The image data used for the image forming operation had a screen pattern applied, having resolution of 1200 dpi and a density of 200 screen lines (lines per inch) parallel to the main scanning direction, in a monochrome binarized expression, and this image data was converted into higher resolution by multiplying the density by four.

Figure 12A:
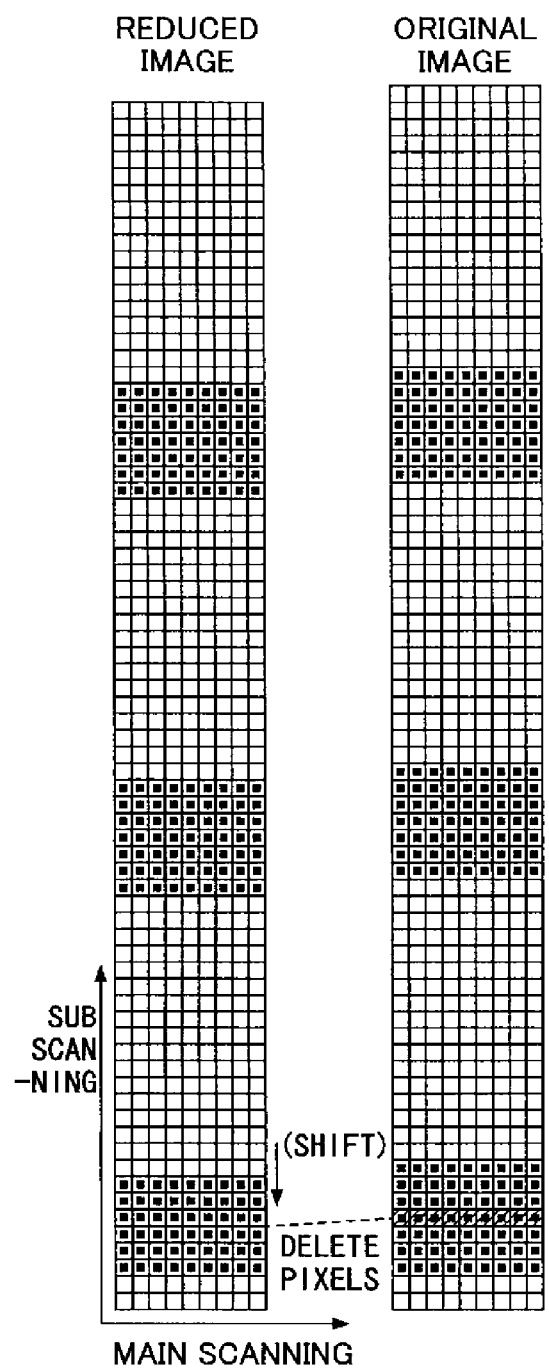
FIGS. 12A and 12B schematically illustrate the image data before pixel deletion and after pixel deletion in a case where the resolution is converted.
Figure 12B:
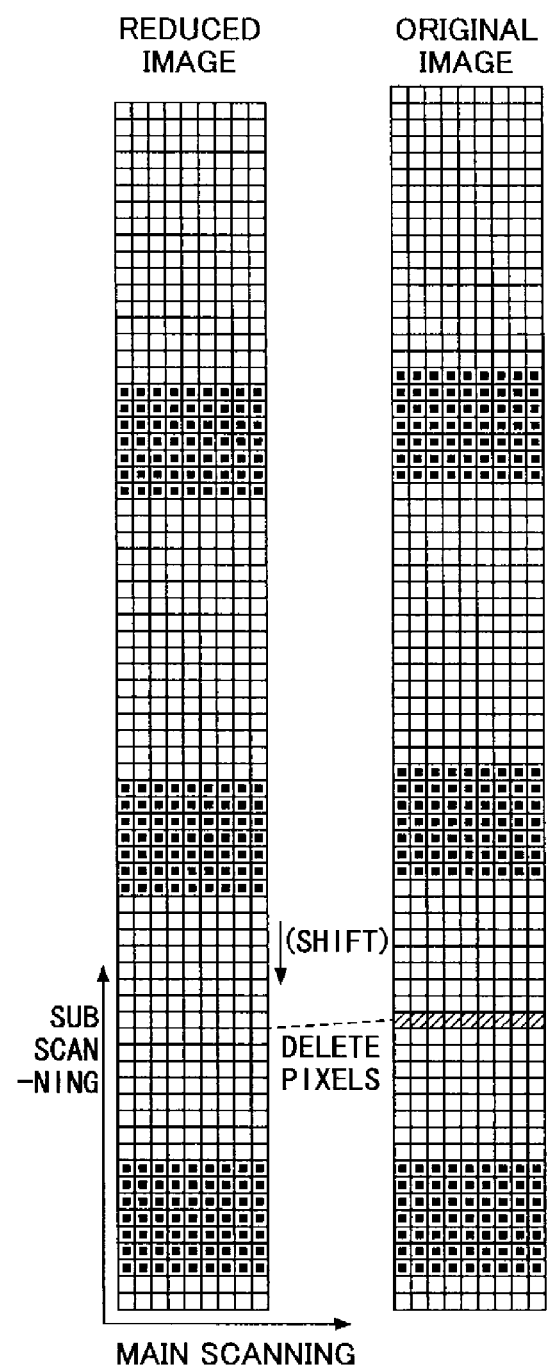

FIGS. 12A and 12B schematically illustrate the image data before pixel deletion and after pixel deletion. FIGS. 12A and 12B illustrate the image data before pixel deletion ("original image" in FIGS. 12A and 12B) including seven scanning lines (lines including black pixels) in every 24 scanning lines, and the image data after pixel deletion ("reduced image" in FIGS. 12A and 12B). Two examples of pixel deletion operations for image reduction correction are illustrated in FIGS. 12A and 12B. FIG. 12A illustrates a case where the pixels included in the image portions ("■" in FIGS. 12A and 12B) are deleted to perform the image reduction correction process. FIG. 12B illustrates a case where the pixels included in the non-image portions ("□" in FIGS. 12A and 12B) are deleted to perform the image reduction correction process. The image data after pixel deletion ("reduced image data") is reduced by approximately 0.4% along the sub scanning direction, compared to the image data before pixel deletion.

In Experiment 2-1 conducted under the above conditions, the extent of banding in the formed images output from the evaluation device was evaluated for the reduced image data that had undergone the image reduction correction process by the methods illustrated in FIGS. 12A and 12B.

(Experiment Results)

Table 2 shows the evaluation results for the images formed with the reduced image data illustrated in FIGS. 12A and 12B. Banding was evaluated by having the same examiner inspect the two images output from the evaluation device formed by the methods illustrated in FIGS. 12A and 12B. The levels of inspected evaluation are indicated by using a five-point scale ranging from "very good" when the streak-like density irregularities cannot be observed to "very poor" when the streak-like density irregularities can be observed and appear to be unpleasant, with "good", "average", and "poor" in between.

TABLE 2

|  | FIG. 12A | FIG. 12B |
|---|---|---|
| Inspected evaluation | Very good | Good |

According to the results shown in Table 2, also in the case of performing image reduction correction after the high resolution conversion, the inspected evaluation is higher for the method of deleting the pixels corresponding to lines of black pixels (deleting pixels from the image portion) than for the method of deleting white pixels (deleting pixels from the non-image portion). Therefore, banding (streak-like density irregularities) can be mitigated more by deleting black pixels.

<<Experiment 2-2>> Double-Sided Output

The experiment was conducted under the following conditions.

(Experiment Conditions)

Figure 13:
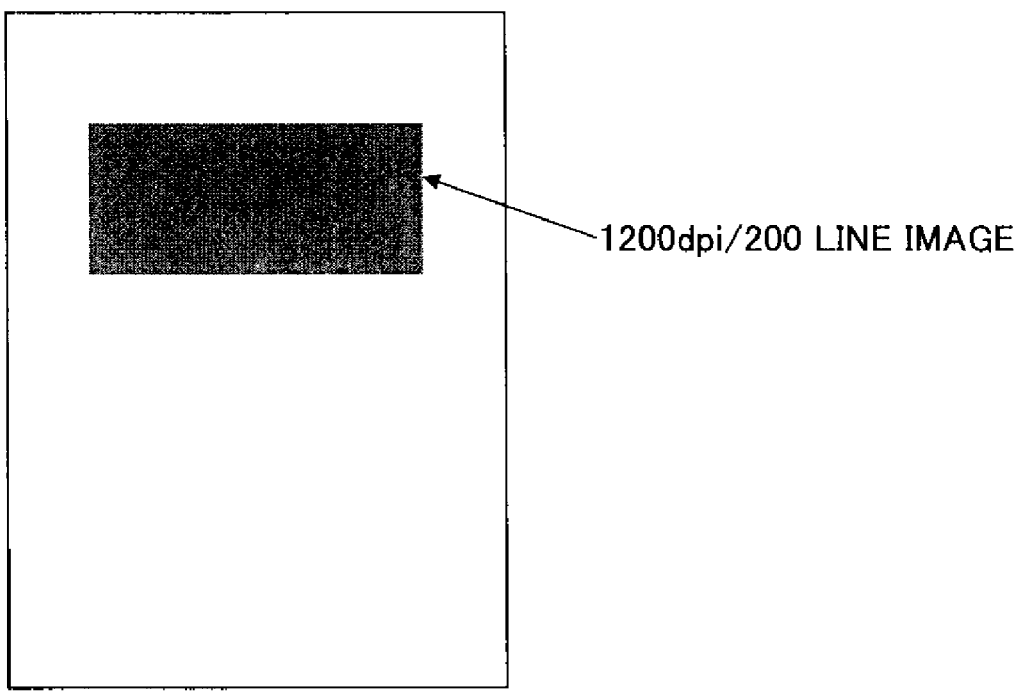
FIG. 13 illustrates an image used for double-sided printing.
Figure 14:
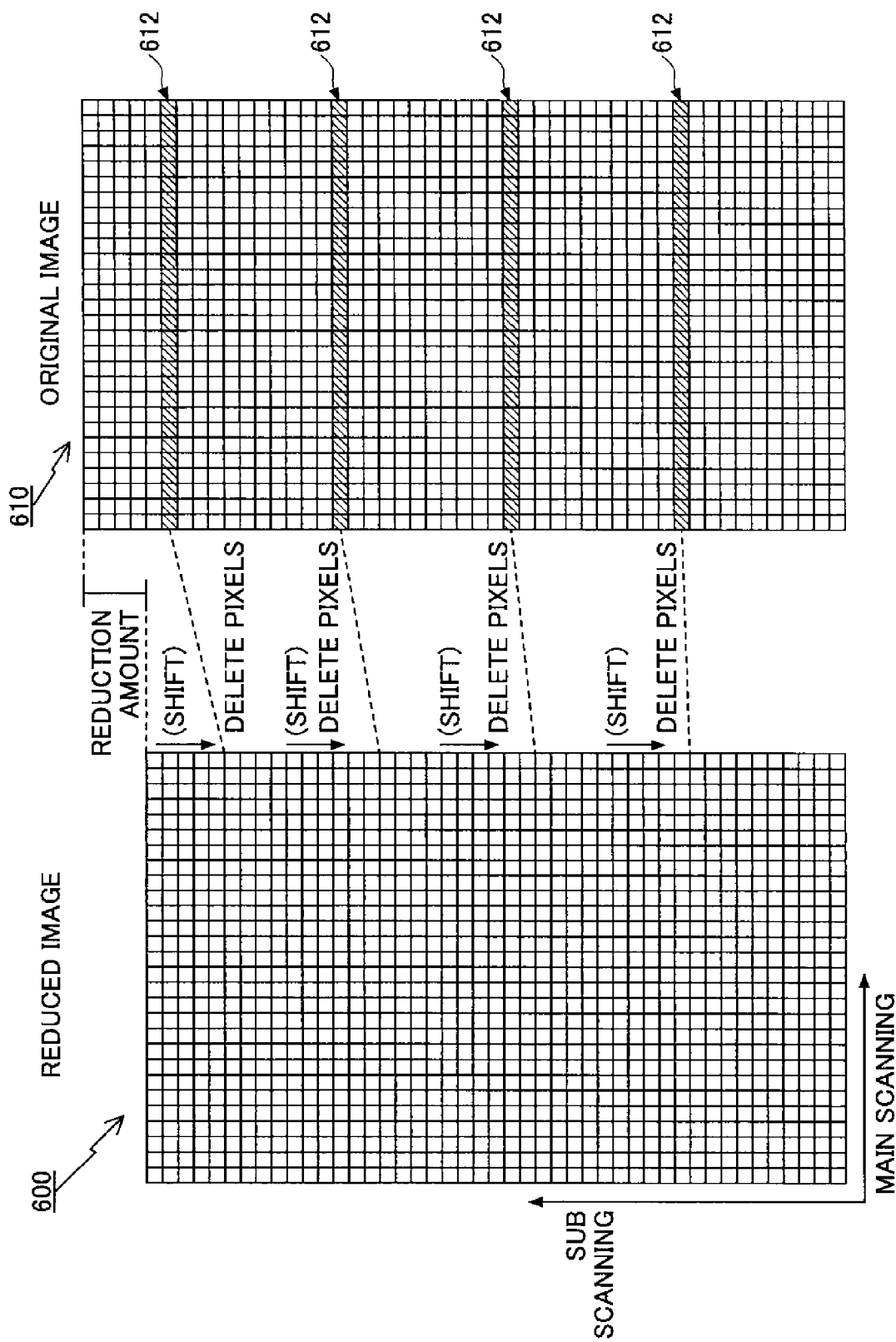
FIG. 14 schematically illustrates an example of an image reduction correction process performed by deleting pixels in the conventional technology.

For the image forming operation, the same evaluation device as that used in Experiment 1 was used. Neutralized paper sheets (NBS Ricoh Type 6200) were used as the output paper. The image shown in FIG. 13 was output on both sides of a sheet from the evaluation device. The image data used for the image forming operation had a screen pattern applied, having resolution of 1200 dpi and a density of 200 screen lines (lines per inch) parallel to the main scanning direction, in a monochrome binarized expression, and this image data was converted into higher resolution by multiplying the density by four.

After pixel deletion, the image data items (reduced image data) were obtained: the reduced image data obtained by deleting pixels from the image portions as shown in FIG. 12A; and the reduced image data obtained by deleting pixels from the non-image portions as shown in FIG. 12B. It has been confirmed according to experiments that a sheet output from the evaluation device is reduced in size by 0.24% at the fixing operation. Therefore, when printing an image on the first page in double-sided printing, the reduced image data is output without modification, and when printing an image on the second page in double-sided printing, the reduced image data is further reduced by 0.24%.

In Experiment 2-2 conducted under the above conditions, the extent of banding as well as positional displacement between the image on the first page and the image on the second page output from the evaluation device were evaluated for the reduced image data that had undergone the image reduction correction process.

(Experiment Results)

Table 3 shows the evaluation results for the images formed with the reduced image data illustrated in FIGS. 12A and 12B. Banding was evaluated by having the same examiner inspect the two images output from the evaluation device formed by the methods illustrated in FIGS. 12A and 12B. The levels of inspected evaluation are indicated by using a five-point scale ranging from "very good" when the streak-like density irregularities cannot be observed to "very poor" when the streak-like density irregularities can be observed and appear to be unpleasant, with "good", "average", and "poor" in between. Similar to the method of evaluating banding, as for the evaluation of positional displacement, "◯" was given when the positional displacement cannot be observed, and "x" was given when the positional displacement can be observed.

TABLE 3

|  | FIG. 12A | FIG. 12B |
|---|---|---|
| Inspected evaluation (Banding) | Very good | Good |
| Inspected evaluation (Positional displacement) | ○ | ○ |

According to the results shown in Table 3, the inspected evaluation is higher for the method of deleting black pixels (deleting pixels from the image portion) for reducing the image to be output on the second page. Therefore, positional displacement between the image on the first page and the image on the second page and banding (streak-like density irregularities) can be mitigated more by deleting black pixels.

As described above, according to the present embodiment, an image processing apparatus, an image forming apparatus, and a recording medium including instructions for performing processes to be performed by the image processing apparatus can be provided, with which computing costs and memory costs for the image reduction correction can be prevented from increasing, and degradation in image quality can be mitigated.

In the above embodiment, the image data that is the target of image reduction correction is in a binarized expression. However, the image data can be expressed by multi-value gradations according to the expression performance of the image forming unit. The deletion positions can be specified by identifying the particular positions in the image regions including pixels for which the exposure power corresponding to the lines or dots is strong and having a gradation value of more than or equal to a predetermined density.

In the above embodiment, an image forming apparatus (MFP) having multiple functions is taken as an example of the image processing apparatus. However, in other embodiments of the present invention, the image processing apparatus can be another image forming apparatus such as a copier or a laser printer. Furthermore, in other embodiments, the image processing apparatus can have a semiconductor device such as an LSI (Large Scale Integration) chip including the above image processing unit.

Furthermore, the above functions can be implemented by a computer-executable program written in a programming language such as assembler or C language. This program can be distributed by being stored in a computer-readable recording medium or by being downloaded via a telecommunication line. Examples of the recording medium are a ROM, an EEPROM (Electronically Erasable and Programmable ROM), an EPROM (Erasable Programmable ROM), a flash memory, a flexible disk, a CD-ROM (Compact Disk-ROM), a CD-RW (CD-ReWritable), a DVD (Digital Versatile Disk), an SD (Secure Digital) card, and an MO (Magneto-Optical disk).

According to an aspect of the present invention, there is provided an image processing apparatus for performing image reduction correction on target image data corresponding to pixels, including a deletion position specifying unit configured to specify, as deletion positions of deletion pixels in the target image data, predetermined positions in image regions including the pixels having gradation values that are more than or equal to a predetermined density; and a pixel deleting unit configured to delete the deletion pixels at the deletion positions specified by the deletion position specifying unit, and to shift the pixels subsequent to the deletion pixels in a reduction direction as the deletion pixels are deleted.

Accordingly, an image forming apparatus according to an aspect of the present invention can identify an image region corresponding to an image portion and an image region corresponding to a non-image portion based on property values of the screen pattern and phase information, specify the deletion positions (for example, substantially in the middle of image regions corresponding to image portions) of the deletion pixels in image regions corresponding to image portions, delete the pixels at the specified deletion positions, and shift the subsequent pixels in the reduction direction as the pixels are deleted, thereby preventing computing costs and memory costs for the image reduction correction from increasing, and mitigating degradation in image quality in a preferable manner.

Additionally, according to an aspect of the present invention, in the image processing apparatus, the target image data has higher resolution, at least in the reduction direction, than that of input image data to be input into an image forming unit configured to perform a process in accordance with the target image data that has been subjected to the image reduction correction.

Additionally, according to an aspect of the present invention, the image processing apparatus further includes an interval determining unit configured to determine deletion intervals at which the deletion pixels are to be deleted, in accordance with a reduction ratio in the reduction direction, wherein the deletion position specifying unit specifies the deletion positions based on the deletion intervals determined by the interval determining unit.

Accordingly, an image forming apparatus according to an aspect of the present invention can perform microscopic image reduction correction without the need of complex calculations.

Additionally, according to an aspect of the present invention, the image processing apparatus further includes a screen process unit configured to perform a screen process on original image data that is input into the image processing apparatus, wherein the deletion position specifying unit identifies the image regions based on pattern properties of the screen process, in order to specify the deletion positions.

Additionally, according to an aspect of the present invention, in the image processing apparatus, the screen process unit expresses gradation of the original image data by widths of lines or sizes of dots; and the deletion position specifying unit specifies the deletion positions based on deletion intervals, repetitive cycles of the lines or the dots, and phases.

Accordingly, an image forming apparatus according to an aspect of the present invention can preferably mitigate banding without requiring excessive computing costs and memory costs, in images expressed by lines or dots where banding usually tends to be noticeable.

Additionally, according to an aspect of the present invention, the image processing apparatus further includes a resolution conversion unit configured to divide the pixels for increasing resolution, wherein the resolution of the target image data is increased, at least in a particular direction, by the resolution conversion unit.

Accordingly, an image forming apparatus according to an aspect of the present invention can perform microscopic image reduction correction without the need of complex calculations.

Additionally, according to an aspect of the present invention, in the image processing apparatus, the reduction direction is at least one of a main scanning direction and a sub scanning direction.

Accordingly, an image forming apparatus according to an aspect of the present invention can perform microscopic image reduction correction along a main scanning direction and/or a sub scanning direction without the need of complex calculations.

Additionally, according to an aspect of the present invention, there is provided an image forming apparatus including the above image processing apparatus according, wherein in the event that double-sided printing is instructed, the image processing apparatus performs the image reduction correction when the image forming apparatus performs an image forming process on a second side of a transfer member.

Accordingly, an image forming apparatus according to an aspect of the present invention can form images in which banding is not noticeable, in such a manner that images formed on both sides of a sheet in double-sided printing are precisely positioned, without the need of complex calculations.

Additionally, according to an aspect of the present invention, there is provided a computer-readable recording medium having recorded therein instructions for causing a computer to function as the above image processing apparatus for performing the image reduction correction on the target image data.

Accordingly, the recording medium in the image processing apparatus according to an aspect of the present invention can cause a computer to identify an image region corresponding to an image portion and an image region corresponding to a non-image portion based on property values of the screen pattern and phase information, specify the deletion positions (for example, substantially in the middle of image regions corresponding to image portions) of the deletion pixels in image regions corresponding to image portions, delete the pixels at the specified deletion positions, and shift the subsequent pixels in the reduction direction as the pixels are deleted.

Accordingly, the recording medium according to an aspect of the present invention can prevent computing costs and memory costs for the image reduction correction from increasing, and mitigate degradation in image quality in a preferable manner, with respect to operations performed with a computer.

The present invention is not limited to the specifically disclosed embodiment, and variations and modifications may be made without departing from the scope of the present invention.

The present application is based on Japanese Priority Patent Application No. 2007-337027, filed on Dec. 27, 2007, the entire contents of which are hereby incorporated herein by reference.

What is claimed is:

1. An image processing apparatus for performing image reduction correction on target image data corresponding to pixels, comprising:
    a deletion position specifying unit configured to specify, as deletion positions of deletion pixels in the target image data, predetermined positions in image regions including the pixels having gradation values that are more than or equal to a predetermined density; and
    a pixel deleting unit configured to delete the deletion pixels at the deletion positions specified by the deletion position specifying unit, and to shift the pixels subsequent to the deletion pixels in a reduction direction as the deletion pixels are deleted.

2. The image processing apparatus according to claim 1, wherein:
    the target image data has higher resolution, at least in the reduction direction, than that of input image data to be input into an image forming unit configured to perform a process in accordance with the target image data that has been subjected to the image reduction correction.

3. The image processing apparatus according to claim 1, further comprising:
    an interval determining unit configured to determine deletion intervals at which the deletion pixels are to be deleted, in accordance with a reduction ratio in the reduction direction, wherein:
    the deletion position specifying unit specifies the deletion positions based on the deletion intervals determined by the interval determining unit.

4. The image processing apparatus according to claim 1, further comprising:
    a screen process unit configured to perform a screen process on original image data that is input into the image processing apparatus, wherein:
    the deletion position specifying unit identifies the image regions based on pattern properties of the screen process, in order to specify the deletion positions.

5. The image processing apparatus according to claim 4, wherein:
    the screen process unit expresses gradation of the original image data by widths of lines or sizes of dots; and
    the deletion position specifying unit specifies the deletion positions based on deletion intervals, repetitive cycles of the lines or the dots, and phases.

6. The image processing apparatus according to claim 1, further comprising:
    a resolution conversion unit configured to divide the pixels for increasing resolution, wherein:
    the resolution of the target image data is increased, at least in a particular direction, by the resolution conversion unit.

7. The image processing apparatus according to claim 1, wherein:
    the reduction direction is at least one of a main scanning direction and a sub scanning direction.

8. An image forming apparatus comprising the image processing apparatus according to claim 1, wherein:
    in the event that double-sided printing is instructed, the image processing apparatus performs the image reduction correction when the image forming apparatus performs an image forming process on a second side of a transfer member.

9. A computer-readable recording medium having recorded therein instructions for causing a computer to function as the image processing apparatus according to claim 1 for performing the image reduction correction on the target image data.

* * * * *